US008868383B2

(12) United States Patent
Kubota et al.

(10) Patent No.: US 8,868,383 B2
(45) Date of Patent: Oct. 21, 2014

(54) CONSUMPTION ENERGY CALCULATING DEVICE

(75) Inventors: Kazuto Kubota, Kawasaki (JP);
Shuichiro Imahara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 458 days.

(21) Appl. No.: 13/232,167

(22) Filed: Sep. 14, 2011

(65) Prior Publication Data

US 2012/0078593 A1    Mar. 29, 2012

(30) Foreign Application Priority Data

Sep. 16, 2010 (JP) ................................ 2010-208103

(51) Int. Cl.
*G06F 7/60* (2006.01)
*G06F 17/10* (2006.01)
(Continued)

(52) U.S. Cl.
CPC ............ *G06Q 10/04* (2013.01); *G06F 2217/80* (2013.01); *G06Q 50/06* (2013.01); *G06F 17/5004* (2013.01); *G05B 2219/2642* (2013.01); *G06F 17/5009* (2013.01); *Y04S 20/221* (2013.01); *Y02B 70/3216* (2013.01)
USPC ........ 703/2; 703/5; 703/9; 700/276; 700/291; 700/296

(58) Field of Classification Search
CPC ............ G06F 17/5004; G06F 17/5009; G05B 2219/2642; Y02B 70/3216; Y04S 20/221
USPC ........................ 703/2, 5, 9; 700/276, 291, 296
See application file for complete search history.

(56) References Cited

U.S. PATENT DOCUMENTS

| 8,355,827 | B2 * | 1/2013 | Egnor et al. ............ 700/291 |
| 2011/0061015 | A1 * | 3/2011 | Drees et al. ............ 715/771 |

(Continued)

FOREIGN PATENT DOCUMENTS

| JP | 2007-199862 | 8/2007 |
| JP | 2008-295193 | 12/2008 |
| JP | 2010-16636 | 1/2010 |

OTHER PUBLICATIONS

Supun, Tiptipakorn, NPL, "Web based integrated multiple function customer demand and budget management system", May 2008.*

*Primary Examiner* — Omar Fernandez Rivas
*Assistant Examiner* — Angel Calle
(74) *Attorney, Agent, or Firm* — Oblon, Spivak, McClelland, Maier & Neustadt, L.L.P.

(57) ABSTRACT

There is provided a consumption energy calculating device which simulates power consumption of a heating and cooling appliance operated by a customer living in a house. A first receiver and a second receiver receive a demand response signal and an external environmental factor parameter. A pain level model shows a relationship between an indoor air temperature and a pain level. A first calculator calculates, when the appliance is not in operation, the indoor air temperature of a next sample time. A second calculator calculates, when the appliance is in operation, determines the indoor air temperature of the next sample time. A working sequence generator determines whether the appliance is or not to be operated during the next sample time. The power consumption determination unit determines power consumption consumed by the appliance before the next sample time and outputs data showing the power consumption.

12 Claims, 15 Drawing Sheets

(51) Int. Cl.

| | | |
|---|---|---|
| G06G 7/48 | (2006.01) | |
| G06G 7/56 | (2006.01) | |
| G06G 7/50 | (2006.01) | |
| G05B 13/00 | (2006.01) | |
| G05B 15/00 | (2006.01) | |
| G05B 21/00 | (2006.01) | |
| G01M 1/38 | (2006.01) | |
| G05D 23/00 | (2006.01) | |
| G05D 3/12 | (2006.01) | |
| G05D 5/00 | (2006.01) | |
| G05D 9/00 | (2006.01) | |
| G05D 11/00 | (2006.01) | |
| G05D 17/00 | (2006.01) | |
| G06Q 50/06 | (2012.01) | |
| G06Q 10/04 | (2012.01) | |
| G06F 17/50 | (2006.01) | |

(56) References Cited

U.S. PATENT DOCUMENTS

2011/0251933 A1* 10/2011 Egnor et al. .................... 705/30
2012/0022700 A1* 1/2012 Drees et al. ................... 700/276
2012/0101653 A1* 4/2012 Tran ............................. 700/296

* cited by examiner

LIVING BEHAVIOR BD

| BEHAVIOR | PROPORTION (%) | AVERAGE (MIN.) | SD (MIN.) |
|---|---|---|---|
| SLEEPING | 100 | 447 | 101 |
| GOING OUT | 99 | 95 | 39 |
| WORKING | 97 | 249 | 39 |
| EATING | 80 | 69 | 38 |
| WATCHING TELEVISION | 54 | 120 | 81 |
| ... | ... | ... | ... |

FIG. 3

FIRST MAPPING TABLE

| APPLIANCE | POWER CONSUMPTION (STANDBY POWER CONSUMPTION) | LIVING BEHAVIOR TO BE ASSIGNED |
|---|---|---|
| LIGHTING | 100 (0) | TURNED ON AFTER 18:00 EXCEPTING THE CASE OF GOING OUT |
| TV | 130 (2.8) | TURNED ON WHEN THE BEHAVIOR OF WATCHING TV IS STARTED |
| IH COOKING HEATER | 2000 (66.0) | TUNED ON FOR 5 MINUTES WHEN THE EARLIEST BREAKFAST IS STARTED BY ONE OF ALL INHABITANTS |
| TOASTER OVEN | 750 (2.8) | TUNED ON FOR 5 MINUTES WHEN THE EARLIEST BREAKFAST IS STARTED BY ONE OF ALL INHABITANTS |
| AIR CONDITIONER | – (2.6) | ONLY STANDBY POWER CONSUMPTION (24 HOURS) IS TAKEN INTO CONSIDERATION. HEATING AND COOLING LOAD IS SEPARATELY TREATED. |
| ... | ... | ... |

FIG. 7

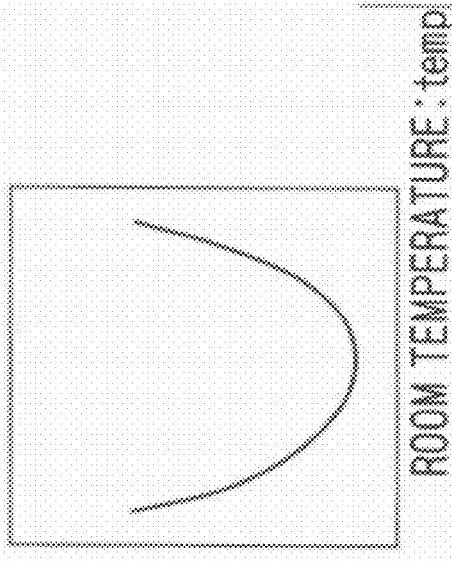
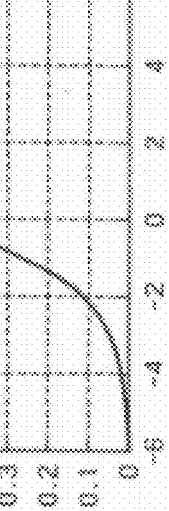
FIG. 8

SECOND MAPPING TABLE

| LIVING BEHAVIOR | BEHAVIORAL STATE | behavior |
|---|---|---|
| SLEEPING | SLEEPING | -10 |
| GOING OUT | GOING OUT | -∞ |
| WORKING | ORDINARY STATE | 0 |
| EATING | EATING | 1 |
| WATCHING TELEVISION | ORDINARY STATE | 0 |
| READING | ORDINARY STATE | 0 |
| TAKING A REST | TAKING A REST | -1 |
| DOING EXERCISING | DOING EXERCISING | 10 |

FIG. 9

$H_{in} = f(Q, T_{out}, T_{room})$
$H_{gen}$ = ENERGY GENERATED IN THE ROOM
$H_{room\_diff} = H_{in} + H_{gen}$
$T_{room}(t) = g(H_{room\_diff}) + T_{room}(t-1)$

CONSUMPTION ENERGY CALCULATING DEVICE

CROSS REFERENCE TO RELATED APPLICATIONS

This application is based upon and claims the benefit of priority from the prior Japanese Patent Application No. 2010-208103, filed on Sep. 16, 2010, the entire contents of which are incorporated herein by reference.

FIELD

Embodiments of the present invention relate to a consumption energy calculating device for calculating the energy consumed by a customer based on a simulation.

BACKGROUND

Demand-side management and demand response have been developed as techniques for controlling the appliances of consumers to reduce the power at the peak of demand. For example, when power demand is expected to exceed an acceptable amount, a power company remotely operates the temperature setting of the air conditioner in every home so that the temperature is not set to 28° C. or lower. Further, in an alternative way, power price is increased to restrain customers from using electric appliances. In this way, the power at the peak of demand can be reduced, and the power company is not required to make an excessive investment in the facilities. Further, fossil fuel which must be used to generate power at the peak of demand can be reduced, which leads to effective reduction of $CO_2$.

It is important to previously predict how much energy can be reduced when uniformly changing temperature setting or when increasing the price. When the request for customers is underestimated, power consumption cannot be reduced enough, while when the request for customers is overestimated, customers have complaints since they are forced to excessively reduce power consumption.

Conventionally, the technique of demand response was used to reduce the power consumption as required while minimizing the total complaint cost, by modeling the relationship between the use situations of home appliances particularly air conditioners and the complaint cost of users while modeling the relationship between the power price and the complaint cost.

However, it is difficult to say that the operational situation of the air conditioner can be accurately simulated by this method, which is because this method is used to determine the operation and temperature set value of the air conditioner based on the outdoor air temperature by using a table, or based on the outdoor air temperature and the average temperature set value of the air conditioner in the past. That is, modeling is performed covering a situation where no inhabitant exists in the house and a situation where the inhabitant is doing exercising in the room, and thus a situation where the air conditioner is not turned on when the outdoor air temperature is high and the room temperature is also high is treated as a modeling target. Further, penalties are similarly calculated on a case where the temperature of the air conditioner is set to low when the sensible temperature of the inhabitant is high since he/she is doing exercising in the room, and on a case where the temperature of the air conditioner is set to low when the inhabitant is staying still in the room.

BRIEF DESCRIPTION OF THE DRAWINGS

FIG. 3 is a diagram showing an example of a living behavior DB.

FIG. 7 is a diagram showing an example of a first mapping table.

FIG. 8 is a diagram showing an air-conditioner operation model as an example of a heating and cooling appliance operation model, and an example of an air-conditioner pain level model.

FIG. 9 is a diagram showing an example of a second mapping table.

DETAILED DESCRIPTION

According to an aspect of embodiments, there is provided a consumption energy calculating device which simulates power consumption of a heating and cooling appliance operated by a customer living in a house, including: a first receiver, a pain level model, a second receiver, a first calculator, a second calculator, a working sequence generator, and a power consumption determination unit.

The first receiver receives a demand response signal specifying a power price.

The pain level model shows a relationship between an indoor air temperature of the house and a pain level of a customer.

The second receiver receives an external environmental factor parameter including information concerning an outdoor air temperature of the house.

The first calculator calculates, when the heating and cooling appliance is not in operation, the indoor air temperature of a next sample time based on the outdoor air temperature of the house and the indoor air temperature of the house, with respect to each sample time.

The second calculator calculates, when the heating and cooling appliance is in operation, required power of the heating and cooling appliance to bring the indoor air temperature to a preset temperature before the next sample time, with respect to each sample time based on the outdoor air temperature and a coefficient of performance of the heating and cooling appliance, determines the indoor air temperature of the next sample time to the preset temperature when the required power is equal to or less than a predetermined maximum power, and calculates the indoor air temperature of the next sample time based on the outdoor air temperature, the indoor air temperature, the required power, and the coefficient of performance when the required power is greater than the predetermined maximum power.

The working sequence generator obtains pain level based on the indoor air temperature for each sample time, calculates an evaluation value based on a weighted sum of the pain level and the power price, and determines whether the heating and cooling appliance is or not to be operated during the next sample time based on a comparison between the evaluation value and a first threshold.

The power consumption determination unit determines power consumption consumed by the heating and cooling appliance before the next sample time and outputs data showing the power consumption, the power consumption being determined to: the predetermined maximum power when the heating and cooling appliance is in operation and the required power is greater than the predetermined maximum power; the required power when the heating and cooling appliance is in operation and the required power is equal to or less than the predetermined maximum power; and a predetermined value when the heating and cooling appliance is not in operation.

In the following, the embodiments will be explained with reference to drawing.

First Embodiment

Figure 1:
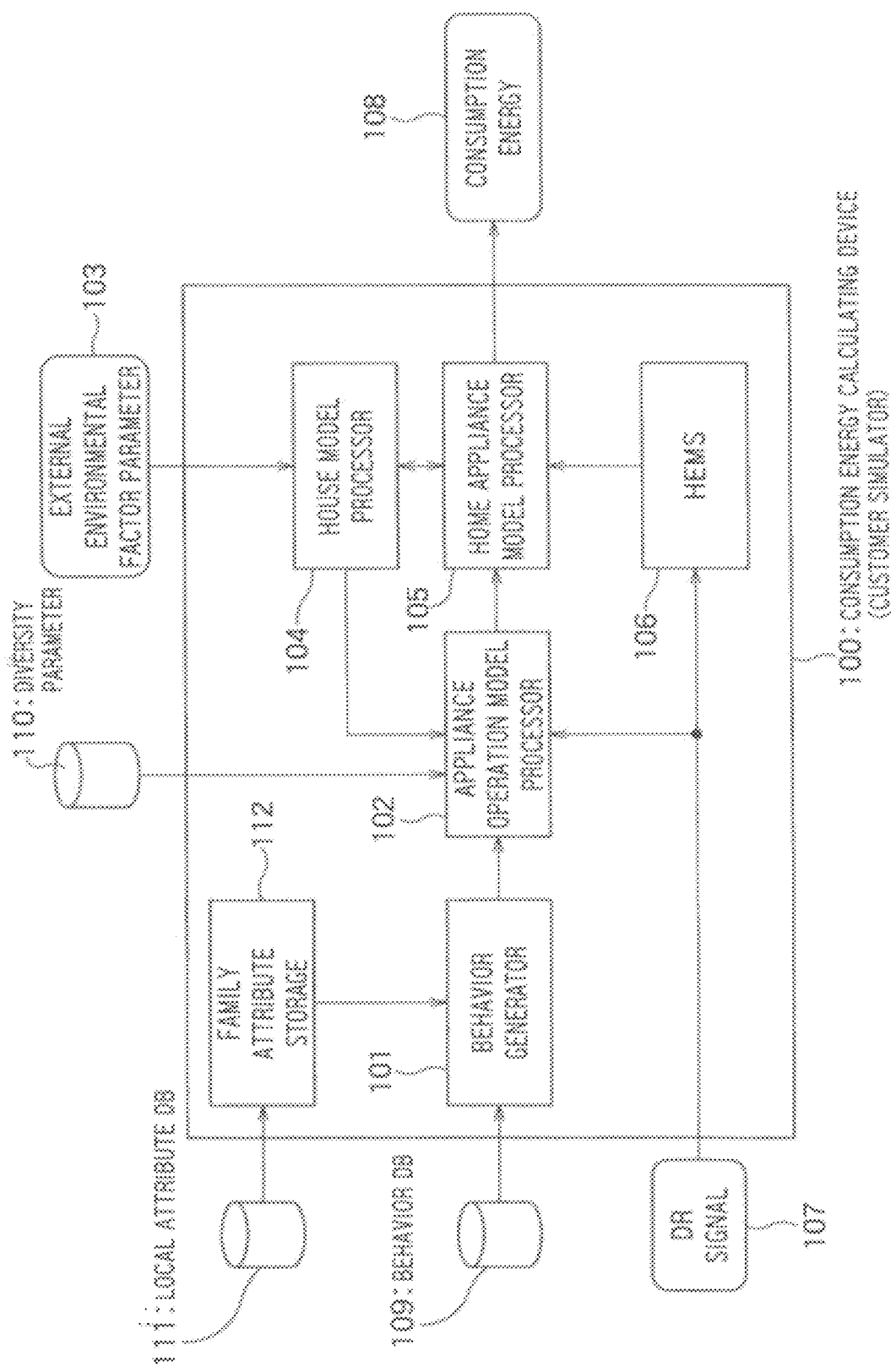
FIG. 1 is a diagram showing the structure of a consumption energy calculating device.

FIG. 1 shows the structure of a consumption energy calculating device (customer simulator) 100.

The consumption energy calculating device 100 includes; a behavior generator 101; an appliance operation model processor (working sequence generator, first receiver) 102; a house model processor (first calculator, second calculator, second receiver) 104; a home appliance model processor (power consumption determination unit) 105; a HEMS (first receiver) 106; and a family attribute storage 112. "HEMS" is the abbreviation of Home Energy Management System.

The consumption energy calculating device 100 is inputted with: an external environmental factor parameter 103; a DR (Demand Response) signal 107; data of a behavior database (DB) 109; a diversity parameter 110; and data of a local attribute DB 111, and predicts (simulates) and outputs consumption energy 108 consumed by a customer (inhabitant in a building such as a house).

Figure 2:
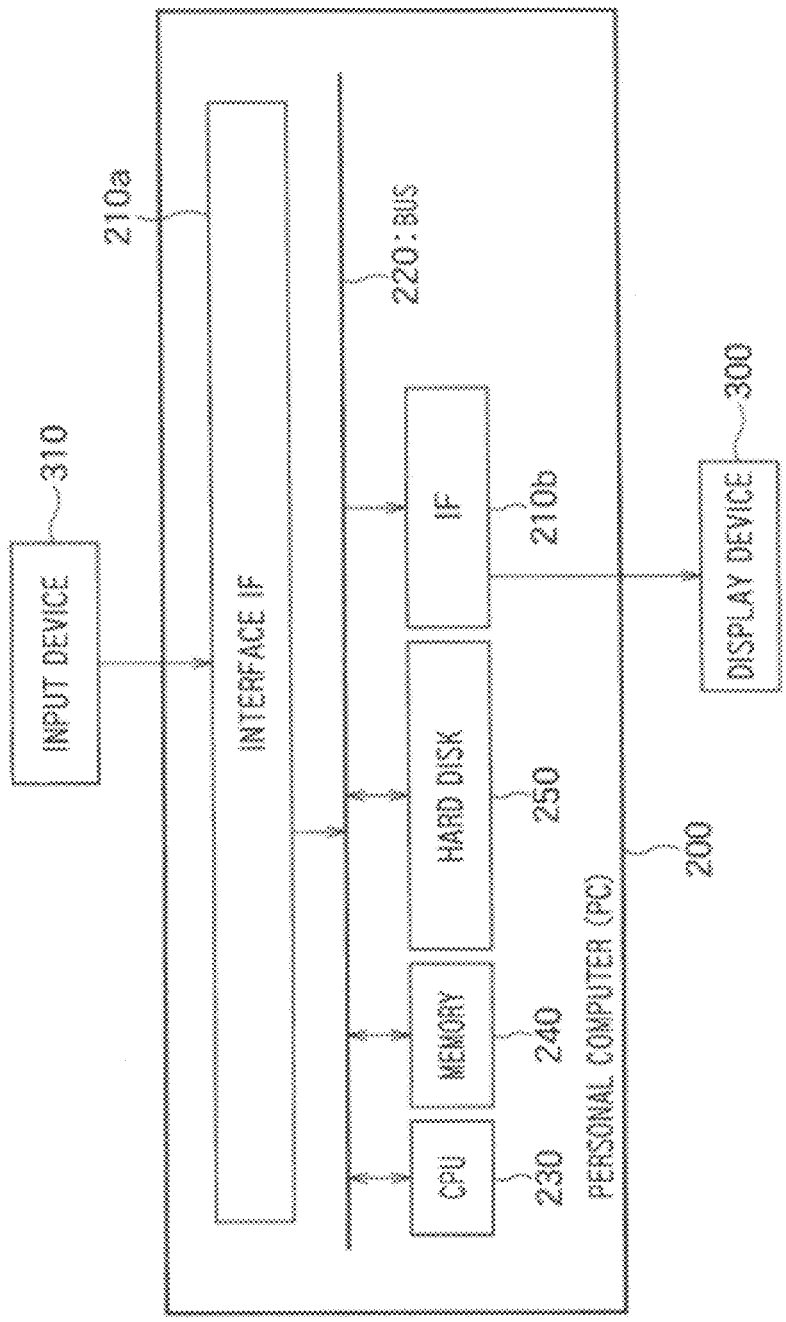
FIG. 2 is a diagram showing an example of hardware configuration of the consumption energy calculating device.

FIG. 2 shows an example of hardware configuration of the consumption energy calculating device 100 of FIG. 1.

The consumption energy calculating device 100 is mounted on a personal computer (PC) 200 as software.

A CPU 230, a memory (storage) 240, a hard disk (storage) 250, and interfaces (IF) 210a and 210b are connect to one another through a bus 220. The software stored in the hard disk 250 is read by the memory 240 when the PC 200 is started. The PC 200 operates as the consumption energy calculating device by letting the CPU 230 read and execute this software stored in the memory 240. Various data generated in the operation is stored in the memory 240 or the hard disk 250.

The DR signal 107 and the external environmental factor parameter 103 are stored in the hard disk 250, and read by the CPU 230 to be inputted into the consumption energy calculating device. Alternatively, the DR signal 107 and the external environmental factor parameter 103 may be inputted by a user through an input device 310 and an interface 210a.

The local attribute DB 111, the behavior DB 109, and the diversity parameter 110 are stored in the hard disk 250.

The consumption energy 108 outputted from the consumption energy calculating device is displayed on a display device 300 through the IF 210b.

Hereinafter, the structure and operation of the consumption energy calculating device of FIG. 1 will be explained.

The local attribute DB 111 stores family structure in a target area, holding ratio of each home appliance, and a Q value indicating insulating characteristics (heat loss coefficient) of the house where the family live.

The information concerning the family structure also covers the number of members, and occupation, sex, age, etc. of each member. The holding ratio of each home appliance is data expressed as (home appliance, holding ratio)=(lighting, 1.00), (TV (television), 1.00), (IH cooking heater, 0.11), (toaster oven, 0.77), (air conditioner, 1.00), for example.

The family attribute storage 112 reads one data element (data concerning one family structure) from the local attribute DB 111, and stores the data therein, and provides the data to the behavior generator 101.

The behavior generator 101 acquires, from the behavior DB 109, statistical information depending on the family structure in the read data, and generates a living behavior sequence. That is, the behavior generator 101 generates simulated behaviors of the inhabitant. In other words, the behavior generator 101 generates likely living behaviors considering the area and family structure. When the family consists of a plurality of inhabitants, the living behavior sequence is generated with respect to each inhabitant. The following explanation is based on the assumption that the number of inhabitants is one for simplification, unless otherwise noted.

Figure 4:
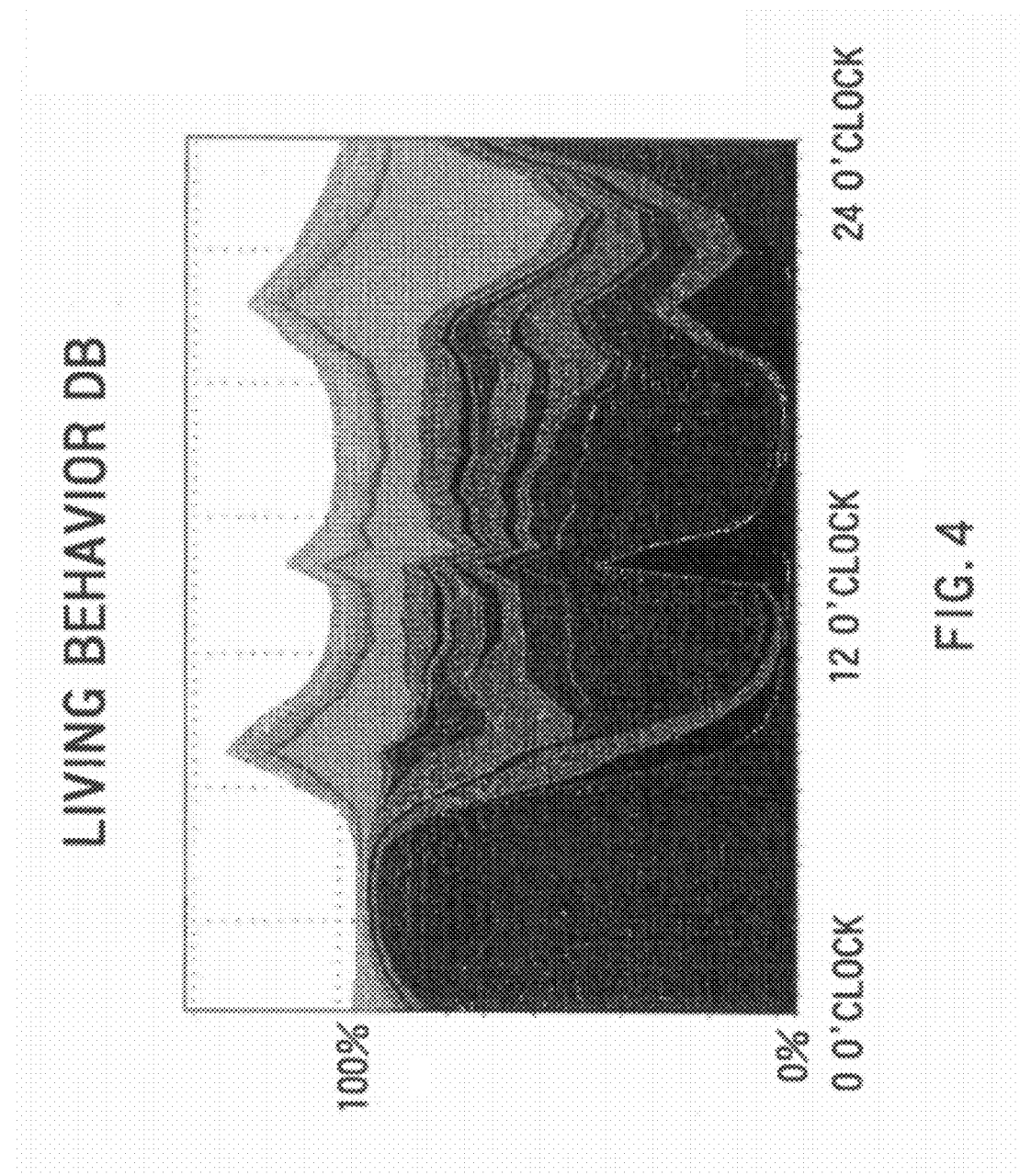
FIG. 4 is a diagram showing an example of the living behavior DB.

FIG. 3 and FIG. 4 each shows an example of the behavior DB 109. This example is based on various statistical data (e.g., Japanese Time Use Survey carried out by NHK).

FIG. 3 shows an example of a table expressing the proportion of inhabitants taking each living behavior, average length, and standard deviation in 1 day (24 hours). Here, the living behavior represents inhabitant's everyday activity such as sleeping and eating.

FIG. 4 shows an example of generation probability of living behaviors during each hour in 24 hours. The sum total exceeds 100% at some points, which is because two kinds of behaviors are occasionally performed at the same time.

The information as shown in FIG. 3 and FIG. 4 is stored in the behavior DB 109 with respect to each individual attribute (e.g., worker, housewife, student, etc.)

The behavior generator 101 generates a behavior sequence in 1 day (24 hours), based on the behavior DB 109. For example, the overall behaviors likely to be taken in 1 day are {sleeping, going out, working, eating, watching television, reading, taking a rest, doing exercising}. In the sequence, each behavior at every time point in 1 day is uniquely determined.

For example, SAGARA et al. (Schedule Data on Inhabitants' Behavior for Various Energy Calculation: Part 3, A Universal Methodology for Data Generating, The Society of Heating, Air-Conditioning and Sanitary Engineers of Japan, No. 105, 2005) generate the living behavior sequence by the following method. The summary of this technique is as described below.

[1] The length of every living behavior is determined based on its proportion, length, and standard deviation, and the length of each living behavior is further adjusted so that the total length of the living behaviors becomes 24 hours.

[2] A certain time point in 24 hours is selected, and one living behavior is selected using generation probability. The selected behavior is arranged around the selected time point.

[3] The next behavior is arranged at the terminal time point of the behavior of [2] using generation probability. This process is repeated until the total length of the living behaviors becomes 24 hours.

[4] The generated behavior sequence is inspected, and if a behavior having a generation probability of 0 is assigned to a certain time point, the sequence is destroyed.

Figure 5:
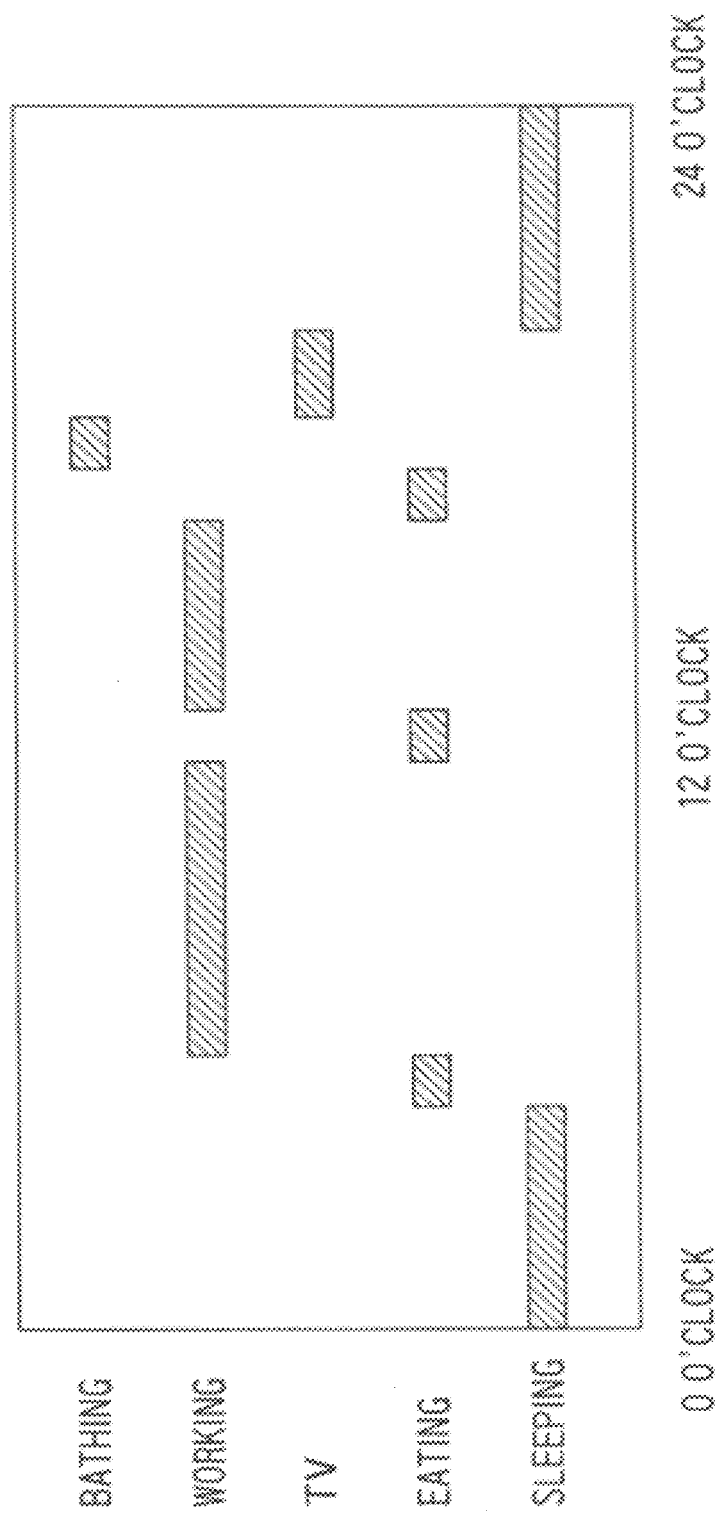
FIG. 5 is a diagram showing an example of a living behavior sequence.

FIG. 5 shows an example of a living behavior sequence created using the above algorithm etc.

Figure 6:
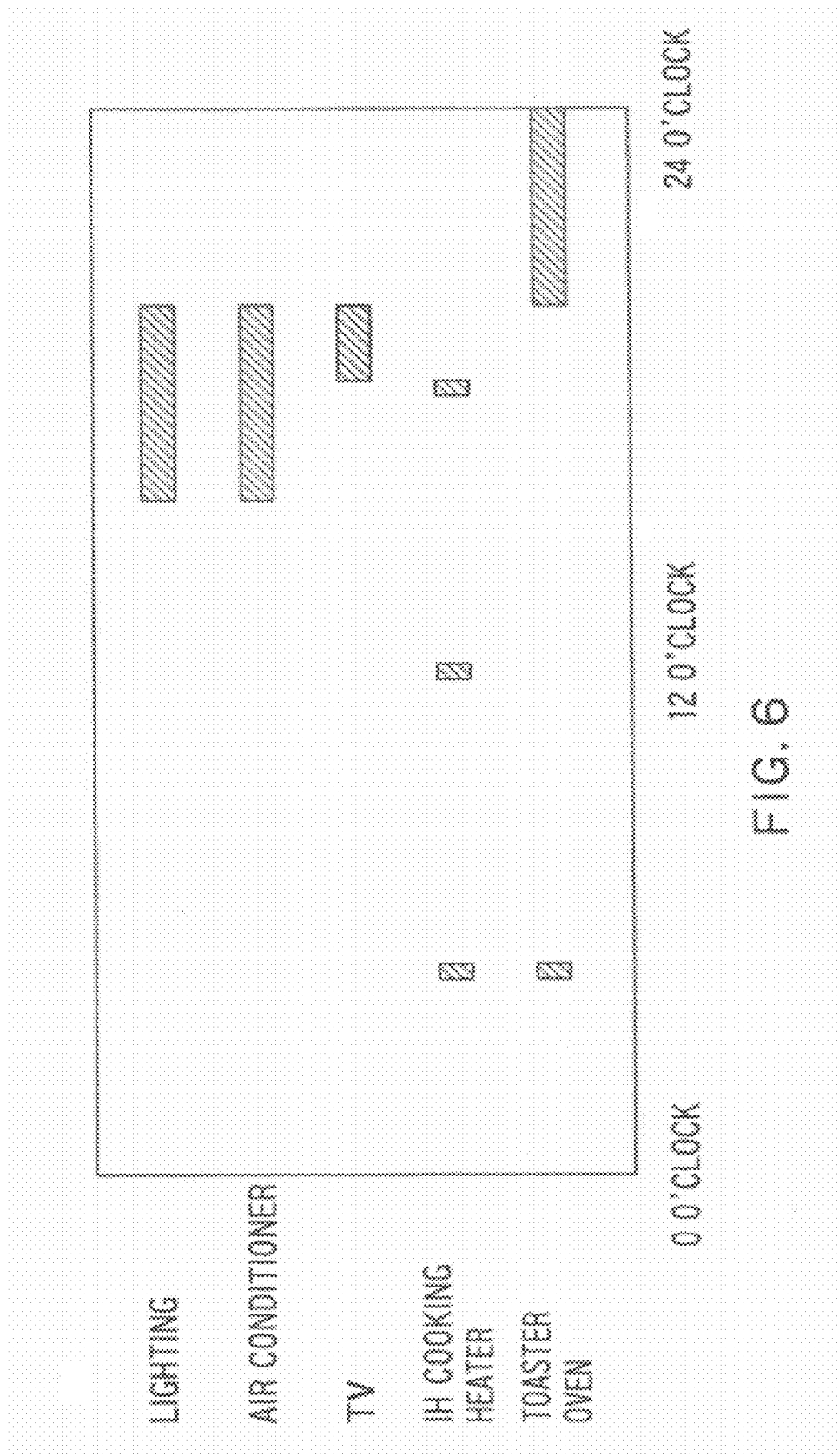
FIG. 6 is a diagram showing an example of the working sequence of home appliances.

Based on the diversity parameter 110, a first mapping table (first mapping information), and a second mapping table (second mapping information), the appliance operation model processor (first receiver, working sequence generator) 102 generates the working sequence of home appliances from the living behavior sequence, in accordance with an appliance operation model. When the home has a plurality of inhabitants, the appliance working sequence of each inhabitant is generated. FIG. 6 shows an example of the home appliance working sequence in 1 day.

Here, the appliance operation model includes two models: a model intended for appliances (ordinary appliances) other than a heating and cooling appliance (heating and cooling load); and a model intended for a heating and cooling appliance. In this specification, depending on the situation, the former is referred to as "ordinary appliance operation model," and the latter is referred to as "heating and cooling appliance operation model," for the sake of convenience.

Further, the appliance operation model includes an air-conditioner pain level model and behavior value information, which are used with the heating and cooling appliance operation model (explained in detail later).

First, the appliance operation model processor 102 determines home appliances arranged in the home, based on the holding ratio of each home appliance. The holding ratio is included in the data read from the local attribute DB 111.

For example, when the holding ratio of an IH cooking heater is 0.11, a random number having a value of 0 to 100 is set in order to determine that no IH cooking heater is held when the random number is 11 or smaller, and to determine that an IH cooking heater is held when the random number has any one of the other values. Such operation is performed with respect to each home appliance.

Next, the appliance operation model processor 102 generates the working sequence of home appliances determined to be held. For example, the working sequence is generated to progress from the beginning of a day (start of simulation) on a unit time basis (that is, at predetermined time intervals) (t=t+1). Each time in this case is referred to as sample time. With respect to the ordinary appliances other than the heating and cooling appliance, 1-day operation sequence may be generated at one time.

The working sequence of the ordinary appliances other than the heating and cooling appliance is generated in accordance with an ordinary appliance operation model. The ordinary appliance operation model is used to generate the appliance working sequence of the ordinary appliances using the first mapping table expressing the relationship between behavior and appliance operation.

FIG. 7 shows an example of the first mapping table. Note that a further detailed mapping is carried out by TANIMOTO et al. (Reference 2: TANIMOTO, SAGARA, HAGISHIMA, MAEDA, Schedule Data on Inhabitants' Behavior for Various Energy Calculation: Part 7, Comparison between real utility supply data of a residential building and predicted one derived from inhabitants' behavior schedule). Further, the first mapping data may be generated using actual data.

Based on the first mapping table, the working sequence of the ordinary appliances is generated. For example, when the living behavior is watching television, it is determined that television is turned on whenever the behavior of watching television is started. When the living behavior is eating, it is determined that the IH cooking heater is turned on for 5 minutes when the behavior of eating is started. When there are a plurality of inhabitants, it is determined that the IH cooking heater is turned on for 5 minutes when the earliest breakfast is started by an inhabitant.

On the other hand, the working sequence of the heating and cooling appliance is generated in accordance with the heating and cooling appliance operation model, using the diversity parameter 110, second mapping table (see FIG. 9), air-conditioner pain level model, and behavior value information.

FIG. 8(A) shows an air-conditioner operation model as an example of the heating and cooling appliance operation model, and FIG. 8(B) shows an air-conditioner pain level model.

The air-conditioner pain level model of FIG. 8(B) expresses the relationship between room temperature (indoor air temperature) and a pain level. The air-conditioner pain level model is created based on the input by the inhabitant, for example. According to the form of the air-conditioner pain level model, the pain level is high in the portions having high and low temperatures, and the pain level is low in the central portion. The air-conditioner pain level model is created only in terms of temperature, but humidity may be further taken into consideration.

On the other hand, as shown in FIG. 8(A), the air-conditioner operation model of FIG. 8(A) can be expressed by Formula (1a) and Formula (1b) shown below.

$$P = \frac{1}{1+e^{-x}}$$ Formula (1a)

$$x = a \cdot \text{pain} - b \cdot \text{price} + c \cdot \text{behavior} + d$$ Formula (1b)

The air-conditioner operation model calculates "P" showing the probability that the air conditioner in the room is started, based on "pain" showing the pain level of the room, "price" showing power price, and "behavior" showing the behavioral state of the inhabitant. P has a value which is larger than 0 and is smaller than 1. As the value of P becomes larger, the probability that the air conditioner is started is increased. The function having such a form as P is called a sigmoid function. Coefficient "a" for pain, coefficient "b" for price, coefficient "c" for behavior a, and constant d are specified by the diversity parameter 110. These coefficients a, b, c, and d may be previously determined by the user, or may be obtained through machine learning, for example. The coefficients a, b, and c have positive values, while d has a positive or negative value.

The pain level "pain" is calculated from room temperature, in accordance with the air-conditioner pain level model of FIG. 8(B). The room temperature is acquired from the house model processor 104 mentioned later.

The "price" showing power price is current power price per 1 kWh, for example. The price value is controlled by the DR signal 107. For example, a previously specified default price is used in normal operation, and if the DR signal instructs to change the price, the price notified by the DR signal 107 may be used. Instead, the DR signal may be given all the time so that the price specified by the DR signal is always used.

Before explaining the "behavior" showing a behavioral state, the second mapping table of FIG. 9 will be explained. The second mapping table relates each living behavior to each behavioral state. The behavioral state is set by grouping the living behaviors depending on the level of influence of the indoor environment. In the example of FIG. 9, living behaviors of sleeping, going out, eating, doing exercising, and taking a rest are mapped to behavioral states having the same names respectively, and living behaviors of working, watching television, and reading are mapped to "ordinary state."

Each behavioral state {sleeping, going out, eating, doing exercising, taking a rest, ordinary state} is assigned with a behavior value such as 10, $-\infty$, $-1$, $-10$, 1, and 0.

The "behavior" which shows a behavioral state and is included in the air-conditioner operation model is the behavior value of FIG. 9. The behavior value is obtained from the second mapping table of FIG. 9 and the living behavior.

Here, one air-conditioner pain level model and one air-conditioner operation model are created for each home. When the home has a plurality of inhabitants, the models for respective inhabitants should be synthesized. For example, by synthesizing (averaging, for example) the air-conditioner pain level models and coefficients a to d of all inhabitants, one air-conditioner operation model and one air-conditioner pain level model can be generated for each home. Since the behavior value of each hour (sample time) differs depending on each inhabitant, the largest behavior value in each sample time should be used as a home representative value, for example.

Concretely, the appliance operation model processor 102 turns ON/OFF the air conditioner serving as the heating and cooling appliance, and determines its set temperature, as in the following way.

First, as an initial process (when starting a 1-day simulation), two variables of xhigh and xlow are generated. Concretely, two random numbers p1 and p2 each having a value between 0 and 1 are generated and converted into x, based on the sigmoid function ($P=1/(1+e^{-x})$) of FIG. 8(A). The large x is treated as an xhigh value, and the smaller x is treated as an xlow value. Each of the xhigh and xlow values corresponds to a first threshold.

Here, in the simulation, x (evaluation value) is calculated with respect to each sample time based on Formula (1b), and it is determined to turn ON the air conditioner when x (evaluation value) exceeds xhigh. In this case, pain is calculated based on Formula (1b) using xlow instead of x on the left-hand side, and the "temp" which is included in the air-conditioner pain level model and satisfies the calculation result is set as a target temperature set value. Two kinds of "temp"s are calculated for one "pain" value, and the "temp" closer to the room temperature during the current sample time is selected. Further, when x (evaluation value) is below xlow, or when outdoor air temperature becomes equal to the set value of the air-conditioner, it is determined to turn OFF the air conditioner. The room temperature (indoor air temperature) and the outdoor air temperature are acquired from the house model processor 104 mentioned later.

In the above explanation, the random numbers p1 and p2 are determined in the initial process when starting the simulation, but the random numbers may be determined by the following another method. In this method, conditions for turning ON the air conditioner are determined by repeating the steps of generating a random number p1, generating a random number p2 which becomes smaller than p1 (p2<p1) at the point when the air conditioner is turned ON, and further generating a random number p3 which becomes larger than p2 (p3>p2) at the point when the air conditioner is turned OFF. Note that the random number to be generated has a value between 0 and 1.

The house model processor 104 calculates the room temperature during each sample time, and retains it as an internal state. The house model processor 104 uses insulating characteristics (Q value) when performing this calculation. It is also possible to use geography information of the house. In this case, the geography information is stored in the local attribute DB 111.

Figure 10:
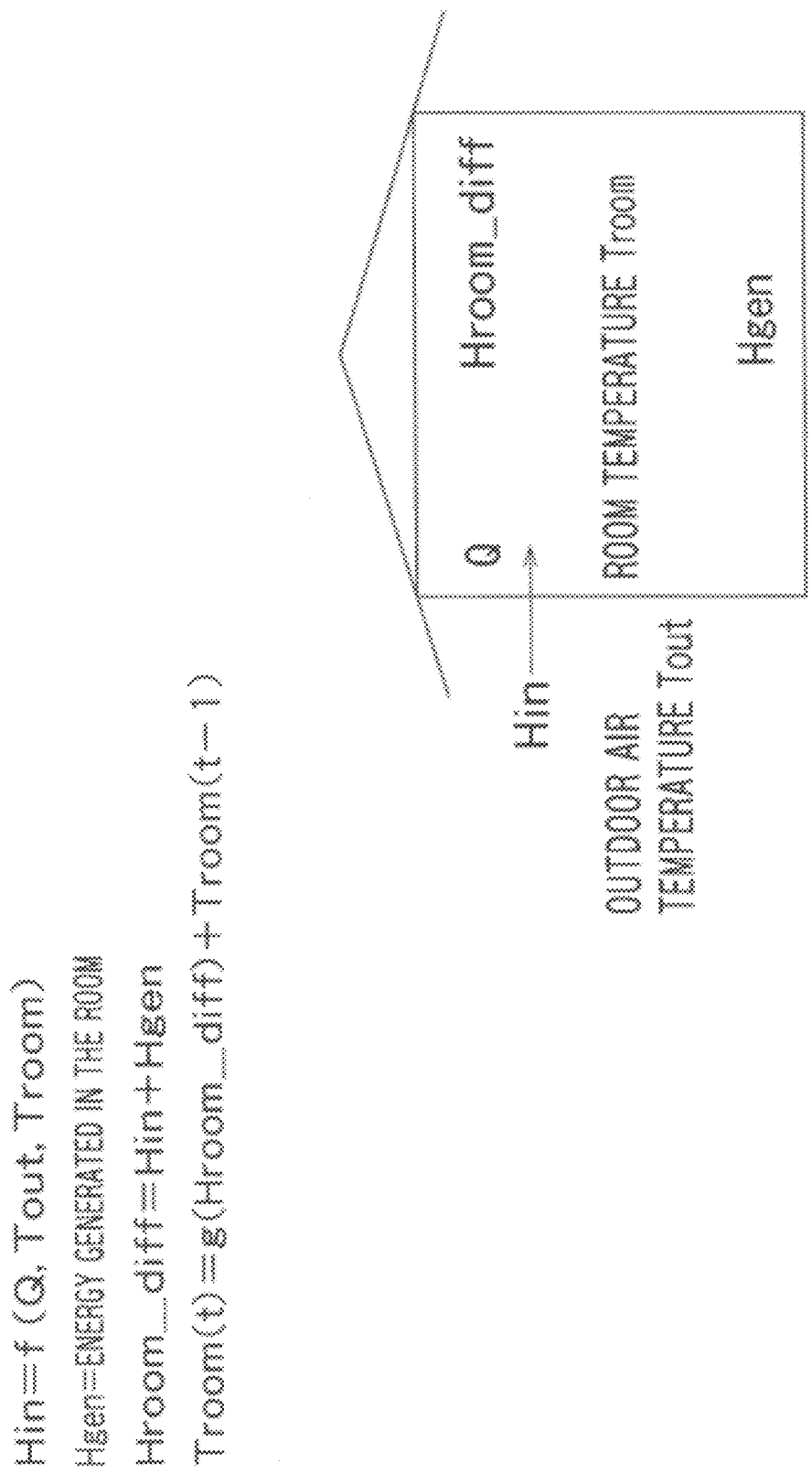
FIG. 10 is a diagram showing a method for calculating the room temperature when an air conditioner is turned OFF.

FIG. 10 shows a method for calculating the room temperature. The room temperature when the air conditioner is turned OFF is calculated by this method.

"Hin" showing the energy flowing into the room is calculated using the difference between "Tout" showing outdoor air temperature and "Troom" showing room temperature, and a heat loss coefficient (Q value) (Hin=f(Q, Tout, Troom)). The function f is a function relating Hin to Q, Tout, and Troom. Here, the outdoor air temperature "Tout" and the room temperature "Troom" belong to a sample time t−1.

The outdoor air temperature "Tout" is specified by the external environmental factor parameter 103 with respect to every time in the simulation period.

Further, "Hgen" showing the thermal energy generated in the room (heat generated due to the energy consumption of each appliance, heat generated by each human body) is calculated by the home appliance model processor 105 mentioned later.

"Hroom_diff" showing the total energy amount of Hin and Hgen (Hroom_diff=Hin+Hgen) is used to calculate g(Hroom_diff) showing how much the temperature will be increased, and by adding it to the current room temperature Troom(t−1), Troom(t) showing the room temperature during the next sample time is calculated. The function g is a function relating Hroom_diff to temperature variation width.

The house model processor 104 transmits the calculated room temperature for the next sample time to the appliance operation model processor 102.

How to calculate the room temperature when the air conditioner is turned ON will be mentioned later.

Figure 12:
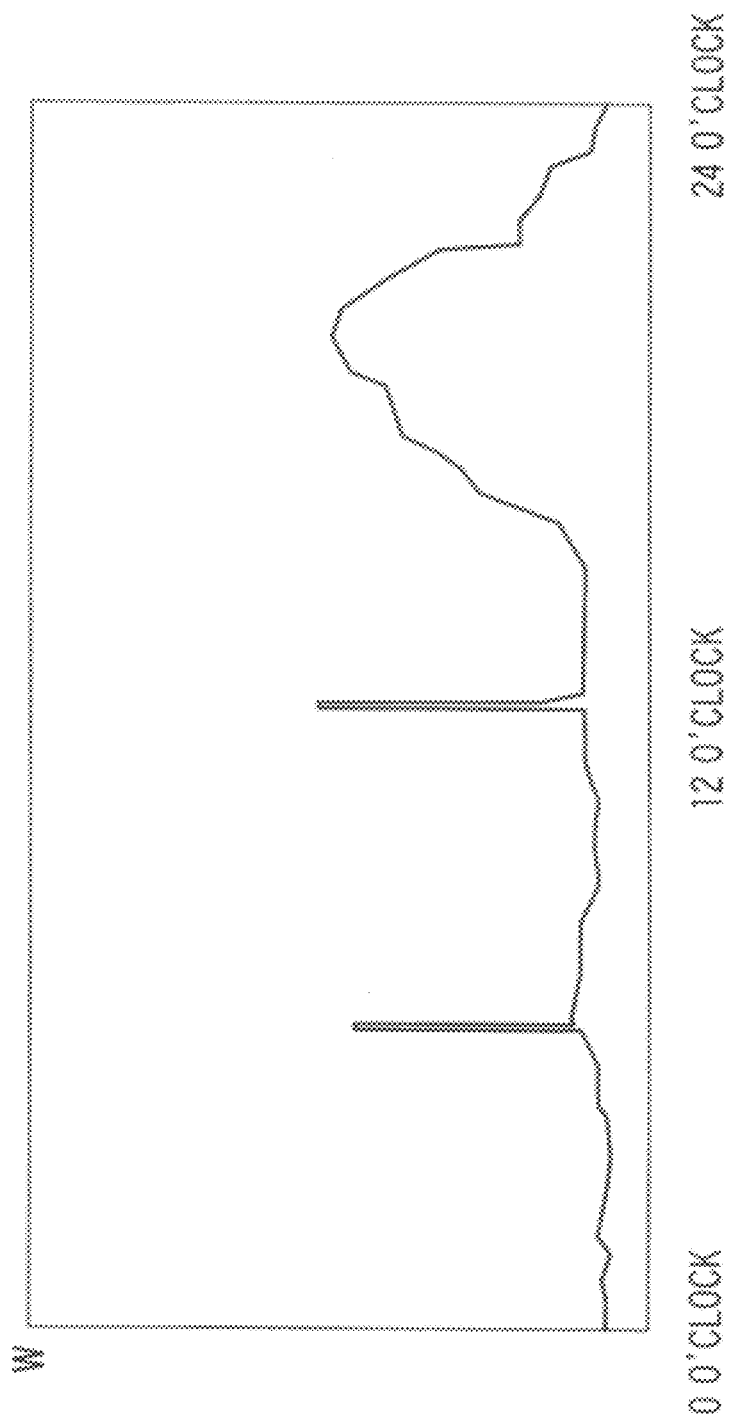
FIG. 12 is a diagram showing an output example of a home appliance model processor.

The home appliance model processor 105 is a simulator for calculating the total power consumption of the home appliances such as air conditioner, refrigerator, and lighting, by calculating the power consumption of each home appliance using the working sequence thereof. FIG. 12 shows the transition in the total power consumption in a certain day outputted from the home appliance model processor 105. In the present embodiment, the total power consumption is calculated and outputted, but it is also possible to output the transition in the power consumption of each home appliance.

The home appliance model processor 105 operates based on the appliance working sequence generated by the appliance operation model processor 102, and the control performed by the HEMS 106.

The home appliance model processor 105 has a model concerning the ordinary appliances other than the heating and cooling appliance (ordinary appliance model) and a model concerning the heating and cooling appliance (heating and cooling appliance model).

The power consumption of each of the ordinary appliances other than the heating and cooling appliance is calculated in accordance with the ordinary appliance model. The ordinary appliance model defines power consumption constantly consumed by the appliance in accordance with the power consumption (standby power consumption) in the mapping table of FIG. 7. That is, the appliance in the appliance working sequence generated by the appliance operation model processor 102 consumes the power consumption in the mapping table of FIG. 7 when it is turned ON, and consumes the standby power consumption in the mapping table of FIG. 7 when it is turned OFF. When standby power consumption is not taken into consideration, standby power consumption may be regarded as zero. In other words, the ordinary appliance when turned OFF consumes power consumption having a predetermined value showing zero or standby power consumption.

For example, TV when turned ON consumes a constant power consumption (=130). Further, TV when turned OFF consumes a constant standby power consumption (=2.8). Consumption energy is converted into thermal energy. The conversion rate is previously defined. Here, the consumption energy is equal to the thermal energy to be generated.

The power consumption of the heating and cooling appliance is calculated, by the home appliance model processor 105, in accordance with the heating and cooling appliance model. For example, the heating and cooling appliance model is an air-conditioner model, the home appliance model processor 105 calculates the power consumption of the air conditioner in coordination with the house model processor 104. Note that the standby power consumption (power consumed when turned OFF) of heating and cooling appliance is calculated similarly to the ordinary appliance model. When the standby power consumption of the heating and cooling appliance is not taken into consideration, the standby power consumption should be regarded as zero. In other words, the heating and cooling appliance when turned OFF consumes power consumption having a predetermined value showing zero or standby power consumption.

Figure 11:
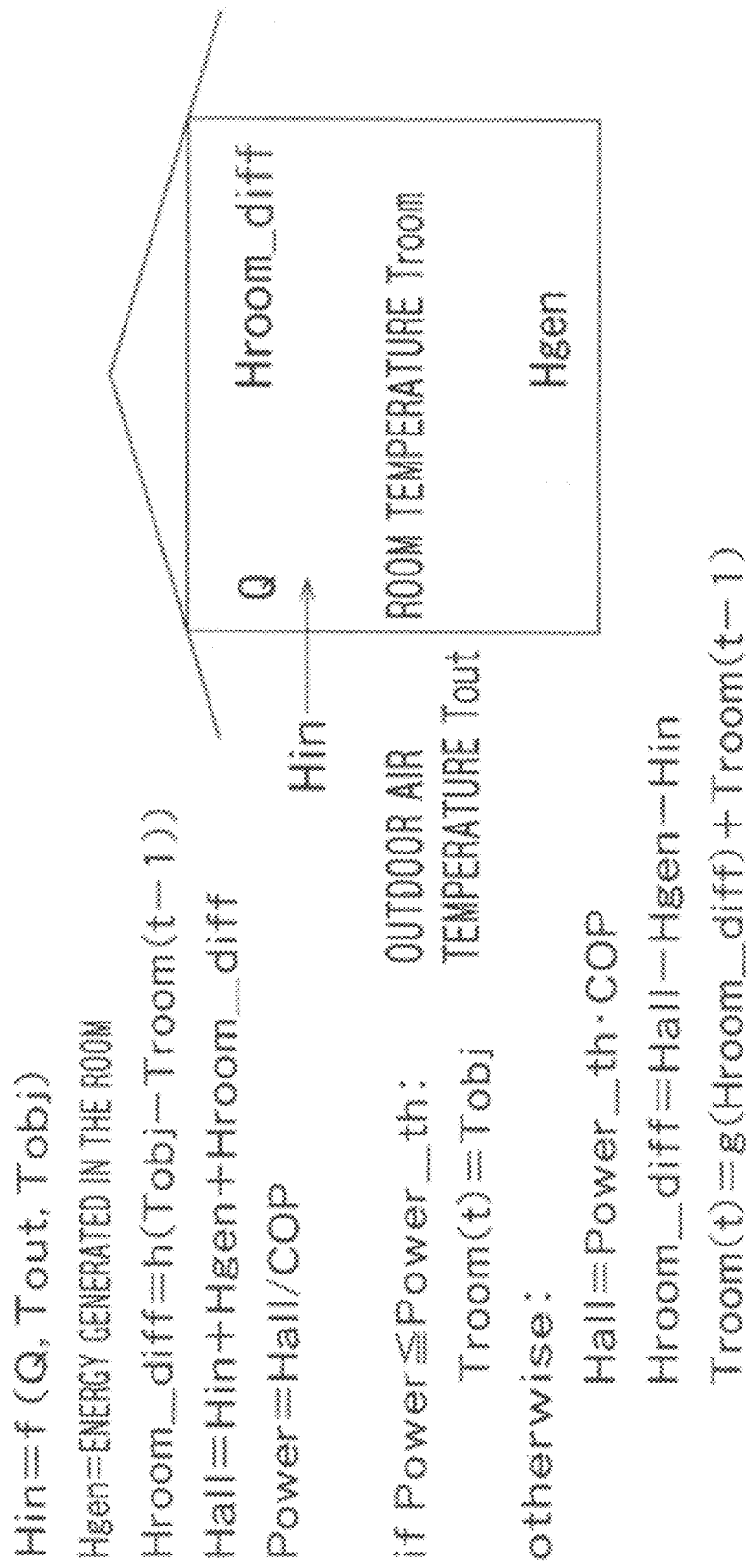
FIG. 11 is a diagram showing an example for calculating the room temperature when the air conditioner is turned ON, and an example for calculating power consumption based on an air-conditioner model.

FIG. 11 shows an example for calculating the power consumption based on the air-conditioner model, and an example for calculating the room temperature when the air conditioner is turned ON. Here, explanation will be given based on the assumption that the air-conditioner is used for cooling.

The house model processor 104 calculates the room temperature when the air conditioner is turned ON as in the following way.

That is, when the target temperature value of the air conditioner is defined as Tobj, "Power" is calculated in accordance with the formulas in the 1st to 5th lines of FIG. 11. The function "h" in the 3rd line is a function relating a temperature difference to "Hroom_diff" showing differential energy due to the change in temperature.

When "Power" is smaller than "Power_th" showing the maximum capacity (maximum power consumption) of the air conditioner, room air temperature "Troom(t)" during the next sample time is set to "Tobj." When "Power" is larger than "Power_th" (that is, when the power required for the air conditioner to bring the room temperature into the target temperature value is larger than "Power_th"), it is impossible to adjust the room temperature to "Tobj." Accordingly, formulas following "otherwise" are used to determine the room temperature during the next sample time (t), based on the outdoor air temperature of 1 sample time before (t−1), the room temperature of 1 sample time before, the required power, and the coefficient of performance (in this case, "Hin" is calculated based on the uppermost formula in FIG. 11, replacing "Tobj" in parentheses with "Troom" (see FIG. 10)). The power consumption "Power" is obtained by dividing "Hall" showing the thermal energy to be discharged from the room by COP (Coefficient of Performance). The "COP" is a coefficient used as an index of the performance of the heating and cooling appliance (indication of energy consumption efficiency).

The energy "Hall" to be discharged is the sum of "Hin" showing the heat flowing into the room from the outside, "Hgen" showing the thermal energy generated by heat generators such as TV and human body, and "Hroom_diff" showing the differential energy due to the change in temperature.

The inflow heat "Hin" is calculated based on the outdoor air temperature of 1 sample time before, the room temperature of 1 sample time before, and the heat loss coefficient Q.

"Hroom_diff" showing the differential energy due to the change in temperature is calculated based on the difference between the room temperature during the next sampling hour and the room temperature of 1 sample time before.

The generated thermal energy "Hgen" is the sum of the energy generated by appliances and that generated by human bodies. The thermal energy generated by the human body per unit time is obtained by using a value previously defined with respect to each living behavior. The energy generated by the appliance is equal to the consumption energy calculated in the ordinary appliance model.

When the room temperature of the sample time does not reach the target temperature value of the air conditioner, the air conditioner is operating with the maximum power consumption. Accordingly, in this case, the maximum power consumption may be determined as the power consumption, without performing the calculation.

The HEMS 106 simulates the operation of the home appliances in accordance with the rules described therein.

For example, under a DR-oriented rule, the following description is given: "DR:Level1→set_property(AIRCON. set temperature)=28." This is a rule showing that the temperature of AIRCON (air conditioner) is set to 28° C. when a Level1 signal is given due to the input of the DR signal 107.

When receiving this signal, the HEMS 106 changes the temperature setting of the air conditioner in operation to 28° C. Note that when the temperature of the air conditioner is set to 28° C. or higher, the air conditioner is kept as it is. Further, the HEMS 106 stops the operation of the home appliance depending on the received signal. Concretely, how to operate the appliance is transmitted to the home appliance model processor 105 and the appliance operation model processor 102, and reflected in their operation.

Figure 13:
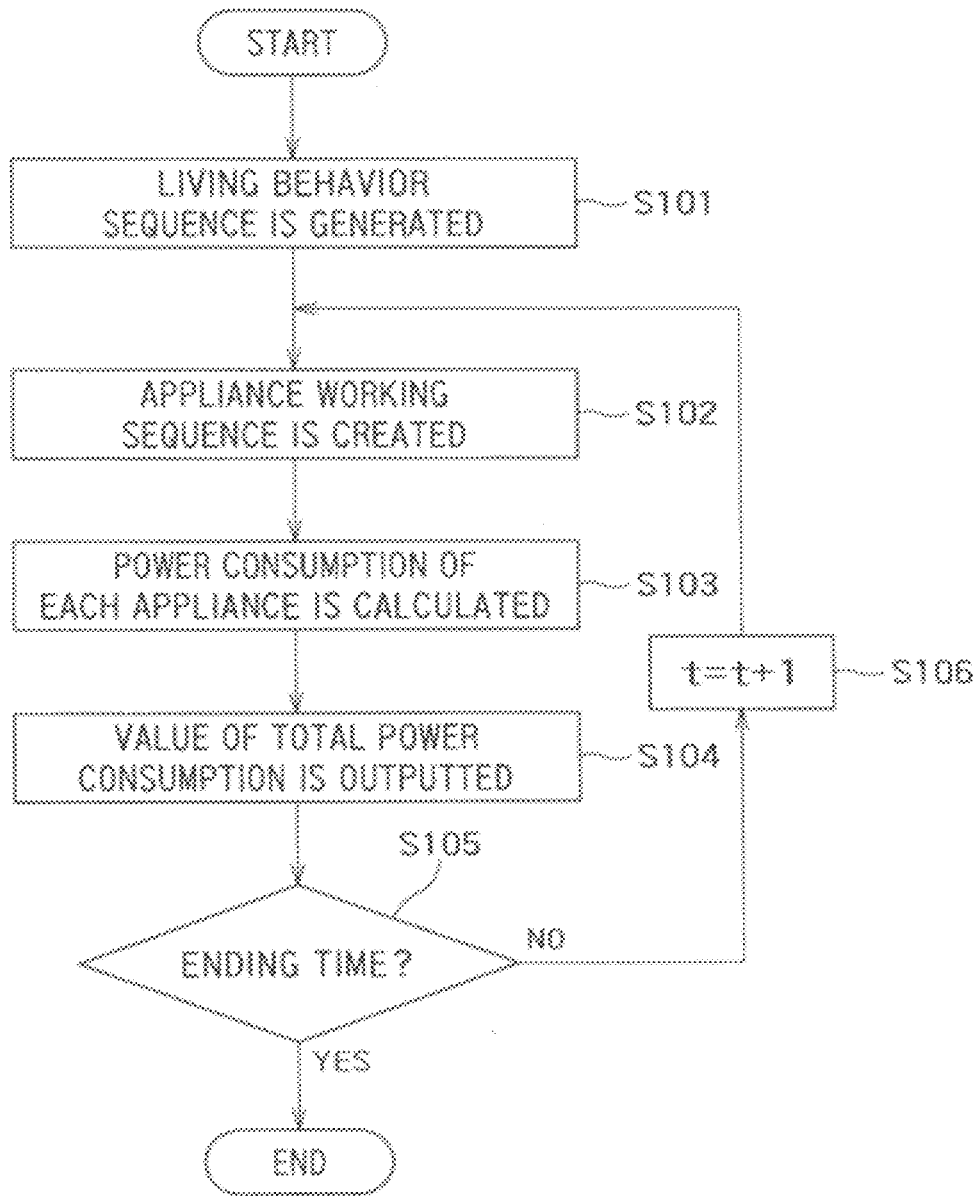
FIG. 13 is a diagram showing the flow of the entire operation performed by the consumption energy calculating device.

FIG. 13 is a flow chart showing the flow of the entire operation performed by the consumption energy calculating device.

The behavior generator 101 creates a 1-day living behavior sequence about a certain family structure (S101).

The appliance operation model processor 102 generates an appliance working sequence during a sample time t, based on the living behavior sequence, information from the house model processor 104, and the DR signal 107 (power price information) (S102).

The appliance working sequence is generated using the first mapping table (see FIG. 7), the second mapping table (see FIG. 9), and the heating and cooling appliance operation model (see FIG. 8). The operation of the ordinary appliances other than the heating and cooling load is uniquely determined based on the first mapping table of FIG. 7, but the operation (to be operated or not to be operated) of the heating and cooling appliance is stochastically determined.

The home appliance model processor 105 calculates the power consumption of each appliance during the sample time t, in accordance with the appliance working sequence (S103). As stated above, the calculation method for the ordinary appliance and that for the heating and cooling appliance are different from each other. The power consumption calculated on each appliance is summed, and the consumption energy 108 showing the information of the sum total value is outputted (S104).

When the process for the simulation period (1 day in this example) is not completed (NO at S105), the sample time is increased by 1 (t=t+1), and the flow returns back to step S102.

When calculation for 1 day is completed (YES at S105), this flow is ended. In this way, data showing the transition in the value of the total power consumption in 1 day (see FIG. 12) is obtained.

Here, the DR signal 107 showing how to control the appliance is inputted into the HEMS 106, the control to be performed on the appliance is determined in accordance with the rule described in the HEMS. In this case, when control for stopping the air conditioner is determined and simulation is performed to stop the air conditioner, the room temperature is sometimes changed to be uncomfortable. The changed indoor environment is evaluated by the air-conditioner operation model, and the air conditioner is expected to be operated (turned ON) again to realize a comfortable indoor environment. In other words, the air-conditioner operation model can simulate the appliance operation manually determined by the user after the automatic operation. Note that it is also possible to model a lighting appliance similarly to the air-conditioner model.

Further, when the appliance operation model processor 102 is notified of the change of power price through the DR signal 107, the air-conditioner operation model is calculated based on the new price. When the price is greatly increased, the probability that the air conditioner is turned OFF is increased, which makes it possible to say that the user will operate the air conditioner to realize an environment having a turned-OFF air conditioner. To the contrary, when the price is reduced, the probability that the air conditioner is turned ON is increased, which makes it possible to say that the user will operate the air conditioner to realize an environment having a turned-ON air conditioner.

Figure 14:
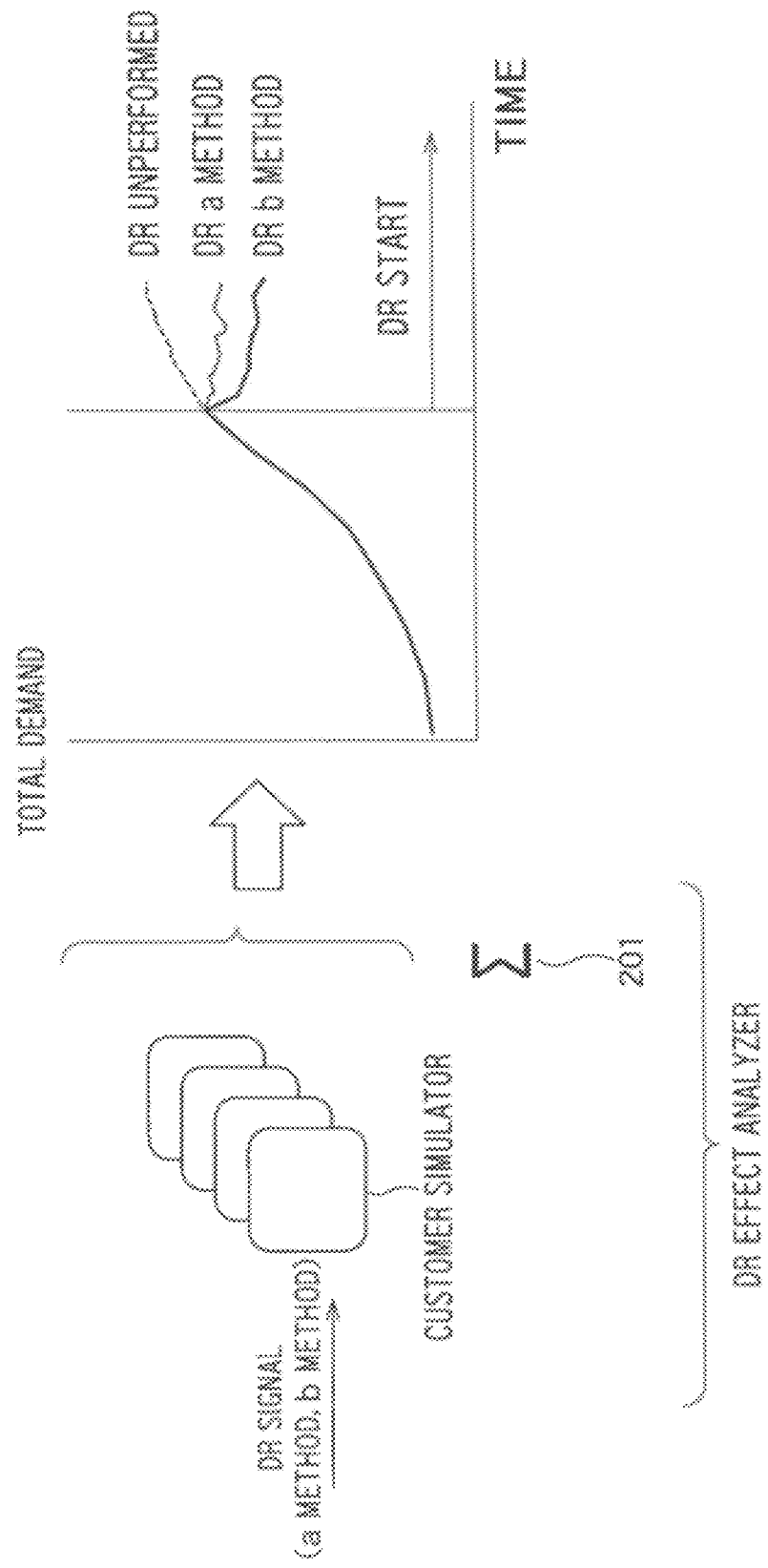
FIG. 14 is a diagram showing an example of a DR effect analyzer having a plurality of consumption energy calculating devices each formed as shown in FIG. 1.

FIG. 14 shows a DR effect analyzer having a summing unit 201 which calculates and outputs the sum total of a plurality of customer simulators each formed as shown in FIG. 1.

Each customer simulator calculates the consumption energy suitable for a family structure in a certain area (e.g., Tokyo), based on the behavior DB 109 and the external environmental factor parameter 103 concerning the area. Note that the behavior DB 109 may include weather condition data in addition to the family structure data. In this case, the external environmental factor parameter 103 may specify a weather condition.

For example, customer simulators having the same number as the total number of homes in a certain area are prepared, and the consumption energy of each home is calculated depending on its family structure (and the weather condition in their area). The summing unit 201 sums up the calculated consumption energy, and outputs the sum total data, by which transition in area-based consumption energy can be estimated.

In this case, as shown on the right side of FIG. 14, when simulation is performed inputting a plurality of DR signals (for instructing "a" method and "b" method, for example), the change in consumption energy depending on each method can be observed. Accordingly, this simulator can be utilized as a DR effect analyzer. That is, it is possible to previously simulate the effect obtained when a DR (demand response) is performed on the customers in a certain area. Accordingly, for example, electricity cost when actually carrying out a demand response can be effectively calculated with accuracy.

As stated above, according to the present embodiment, how the inhabitant operates each appliance based on the power price and room environment is estimated to simulate the reaction by the customer to the demand response, by which consumption energy in the simulated case can be calculated. Further, consumption energy can be calculated with more accuracy by modeling how each appliance is operated by a human, using the power price, situation of the human staying in the room, and comfort level in the room.

Second Embodiment

Formula 1a of the air-conditioner operation model used by the appliance operation model processor 102 in the first embodiment is changed as follows.

$$P' = 1, \text{ if } (x > 0)$$

$$P' = 0, \text{ otherwise}$$

Figure 15:
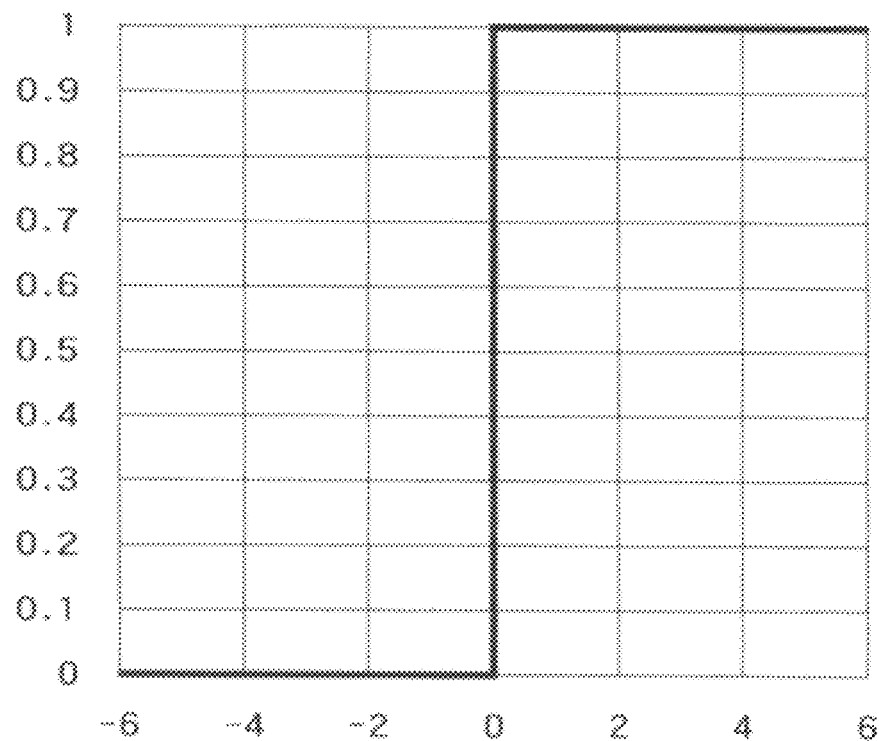
FIG. 15 is a diagram showing a graph display example of an air-conditioner operation model according to a second embodiment.

The changed graph display of the air-conditioner operation model is as shown in FIG. 15.

This changed model specifies that the inhabitant always carries out the same operation under the same condition.

Figure 16:
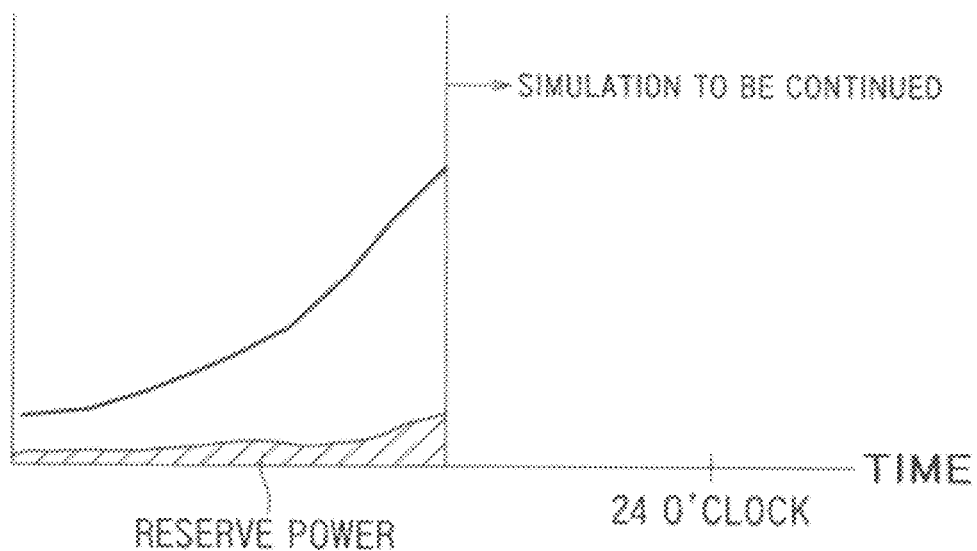
FIG. 16 is a diagram showing the transition in reserve power.

Compared to the model of FIG. 8(A), the operation for turning ON when x is smaller than 0 (second threshold) in FIG. 8(A) can be considered to be redundant. In other words, when x is 0, it is possible to consider that the inhabitant feels no pain regardless of whether the air conditioner is turned ON or OFF. In this case, the operation of turning ON the air conditioner when x is smaller than 0 can be regarded as redundant. Accordingly, in this case, power consumption saved by turning off the air conditioner can be considered as reserve power. The home appliance model processor 105 calculates and outputs the reserve power. The reserve power is power consumption of the air conditioner generated by turning ON the air conditioner when x is 0 or smaller. FIG. 16 shows the transition in area-based consumption energy and the transition in outputted reserve power.

As stated above, this simulation technique makes it possible to previously calculate the potential of how much energy can be reduced by the customers under a certain weather condition in a certain area. For example, when power demand is tight, whether or not to start a power plant can be determined using this technique. Further, it is possible to determine to forcibly turn OFF the air conditioner depending on the reduction potential, without causing any problems.

The invention claimed is:

1. A computer-implemented consumption energy calculating device which simulates power consumption of a heating and cooling appliance operated by a customer living in a house, comprising:
   a first receiver configured to receive a demand response signal specifying a power price;
   a pain level model showing a relationship between an indoor air temperature of the house and a pain level of a customer;
   a second receiver configured to receive an external environmental factor parameter including information concerning an outdoor air temperature of the house;
   a first calculator, including a processor configured to calculate, when the heating and cooling appliance is not in operation,
     the indoor air temperature of a next sample time based on the outdoor air temperature of the house and the indoor air temperature of the house, with respect to each sample time;

a second calculator, including the processor configured to calculate, when the heating and cooling appliance is in operation,
  required power of the heating and cooling appliance to bring the indoor air temperature to a preset temperature before the next sample time, with respect to each sample time based on the outdoor air temperature and a coefficient of performance of the heating and cooling appliance,
  determine the indoor air temperature of the next sample time to the preset temperature when the required power is equal to or less than a predetermined maximum power, and
  calculate the indoor air temperature of the next sample time based on the outdoor air temperature, the indoor air temperature, the required power, and the coefficient of performance when the required power is greater than the predetermined maximum power;
a working sequence generator, including the processor configured to obtain pain level based on the indoor air temperature for each sample time,
  calculates an evaluation value based on a weighted sum of the pain level and the power price, and
  estimate whether a user puts the heating and cooling appliance in operation or not in operation during the next sample time based on a comparison between the evaluation value and a first threshold; and
a power consumption determination unit, including the processor configured to determine power consumption consumed by the heating and cooling appliance before the next sample time and output data showing the power consumption,
  the power consumption being determined to:
    the predetermined maximum power when it is estimated that the user puts the heating and cooling appliance in operation and the required power is greater than the predetermined maximum power;
    the required power when it is estimated that the user puts the heating and cooling appliance in operation and the required power is equal to or less than the predetermined maximum power; and
    a predetermined value when the user puts the heating and cooling appliance not in operation.

2. The device of claim 1, further comprising:
a storage configured to store a behavior sequence showing a pattern of living behaviors of the customer, and a behavior value assigned to each living behavior,
wherein the working sequence generator calculates the evaluation value by adding the behavior value corresponding to the behavior of the customer weighted by a predetermined coefficient to the weighted sum.

3. The device of claim 1, wherein the predetermined value is standby power consumption of the heating and cooling appliance or zero.

4. The device of claim 1, further comprising a storage configured to store:
a working sequence of an ordinary appliance different from the heating and cooling appliance;
information of power consumed when the ordinary appliance is in operation; and
information of power consumed when the ordinary appliance is not in operation,
wherein the power consumption determination unit calculates power consumption consumed by the ordinary appliance before the next sample time, and adds calculated power consumption to the power consumption determined on the heating and cooling appliance, and the output unit outputs data showing added power consumption.

5. The device of claim 4, wherein
the first calculator calculates electric energy consumed by the ordinary appliance during the next sample time, and calculates indoor air temperature of the next sample time based on a magnitude of thermal energy generated depending on the consumed electric energy, and
based on the magnitude of the thermal energy, the second calculator calculates the required power and determines the indoor air temperature of the next sample time.

6. The device of claim 1 further comprising a storage configured to store:
a behavior sequence showing a pattern of living behaviors of the customer; and
consumption energy per unit time, defined with respect to each living behavior of the customer,
wherein the power consumption determination unit calculates, based on the behavior sequence, consumption energy consumed by the behavior of the customer before the next sample time, and calculates the indoor air temperature of the next sample time based on a magnitude of thermal energy generated depending on the consumption energy, and
based on a magnitude of thermal energy generated by the behavior of the customer before the next sample time, the second calculator calculates the required power and determines the indoor air temperature of the next sample time.

7. The device of claim 1, wherein
a magnitude of thermal energy generated depending on electric energy consumed by the heating and cooling appliance is used to calculate the indoor air temperature of the next sample time, and
based on a magnitude of thermal energy generated by the behavior of the customer before the next sample time, the second indoor air temperature calculator calculates the required power and determines the indoor air temperature of the next sample time.

8. The device of claim 1, wherein when the first receiver receives the demand response signal instructing that the heating and cooling appliance should not be in operation, the power consumption determination unit regards that the heating and cooling appliance is not in operation before at least the next sample time.

9. The device of claim 1, wherein the power consumption determination unit calculates reserve power which is power consumed by the operation of the heating and cooling appliance when the evaluation value is smaller than a second threshold, and
the output unit outputs data showing a value of the reserve power.

10. The device of claim 9, wherein the second threshold is a central value in an available range of the evaluation value.

11. The device of claim 1, wherein the working sequence generator calculates, as the evaluation value, a probability that the user puts the heating and cooling appliance in operation or not in operation, and estimates based on the calculated probability whether the user puts the heating and cooling appliance in operation or not during the next sample.

12. A demand response effect analyzer, comprising:
a simulation controller configured to perform simulation with respect to each of a plurality of houses by using the consumption energy calculating device according to claim 1 and obtain power consumption of each house for each sample time; and a summing unit configured to sum up the power consumption obtained with respect to each house, and outputs data showing a sum total.

\* \* \* \* \*